Figure 1:
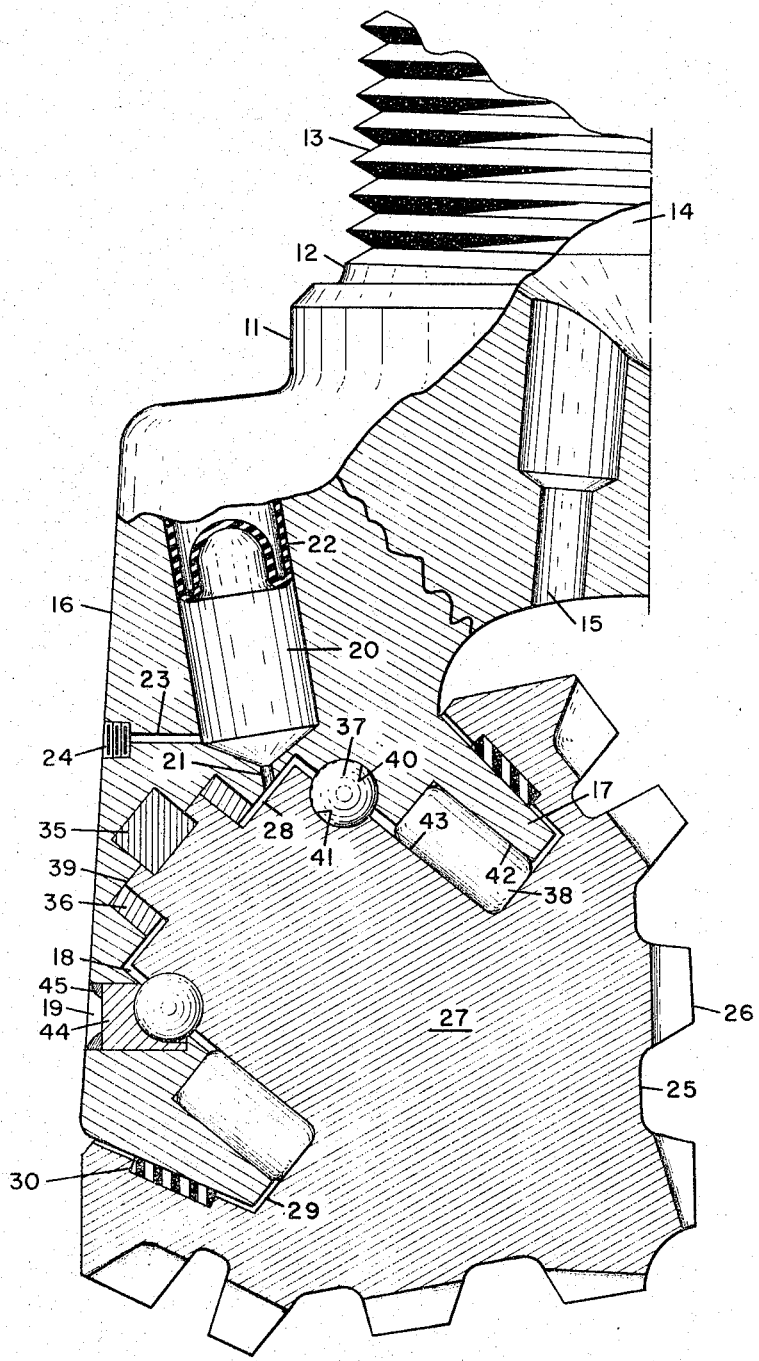

Alexander B Hildebrandt
INVENTOR.

March 7, 1967 A. B. HILDEBRANDT 3,307,645
REVERSE BEARING BIT

Filed Oct. 20, 1964 3 Sheets-Sheet 2

Alexander B Hildebrandt
INVENTOR.

BY James E. Reed
ATTORNEY

March 7, 1967 A. B. HILDEBRANDT 3,307,645
REVERSE BEARING BIT

Filed Oct. 20, 1964 3 Sheets-Sheet 3

Alexander B Hildebrandt
INVENTOR.

BY James E. Reed
ATTORNEY

United States Patent Office 3,307,645
Patented Mar. 7, 1967

3,307,645
REVERSE BEARING BIT
Alexander B. Hildebrandt, Tulsa, Okla., assignor, by mesne assignments, to Esso Production Research Company, Houston, Tex., a corporation of Delaware
Filed Oct. 20, 1964, Ser. No. 405,146
7 Claims. (Cl. 175—372)

The present invention relates to rotary bits for drilling boreholes in the earth and is particularly concerned with improved rock bits less susceptible to bearing failure than rock bits available in the past.

The rock bits used in drilling oil wells and similar boreholes generally have conical cutting elements provided with teeth or buttons which make rolling contact with the formation at the bottom of the borehole. Each of these cutting elements or cones is mounted on a cantilever pin by means of a bearing assembly located within the cone. This assembly normally consists of a sleeve bearing mounted near the apex of the cone, a ball bearing provided with races machined in the pin and cone surfaces at an intermediate point along the cone axis, and a roller bearing including similar races located near the base of the cone. Such an assembly has an advantage over most other bearing arrangements in that it provides a convenient means for locking the cone in place. The balls employed are inserted into the ball bearing races through a hole in the cone or pin after the cone and other bearing elements have been positioned on the pin. Plugging of the hole prevents escape of the balls and thus prevents disengagement of the cone from the pin. Despite this advantage, experience has shown that such an assembly leaves much to be desired. Improvements in cone metallurgy and other changes in rock bit design have improved the life of such bits to a point where bearing failure has become the limiting factor in their use. To minimize the possibility of losing the cones and bearing elements in the borehole, it has become common practice to discard rock bits after only a few hours operation even though they may still be in operable condition. This increases the number of bits which must be used in drilling to a given depth and necessitates trips into and out of the borehole which might otherwise be avoided.

It is therefore an object of the present invention to provide an improved rock bit having greater bearing life than rock bits available in the past. Another object is to provide a more effective method for mounting the cones on rock bits to alleviate difficulties due to premature failure of the bearings. A further object is to provide an improved rock bit bearing assembly which is more reliable and less susceptible to bearing failure than assemblies employed heretofore. Still further objects will become apparent as the invention is described in greater detail hereafter.

In accordance with the invention, it has now been found that many of the difficulties encountered with rock bits employed heretofore can be avoided by utilizing reverse bearing assemblies in which the outer bearing races remain stationary and the inner races rotate with the cones. This arrangement, by substantially eliminating relative movement between the outer races and the applied load on the cones under normal operating conditions, result in significantly better bearing life than can otherwise be obtained. For a given bearing load the bearing life of the improved bits may be as much as 40% greater than that of conventional rock bits.

Figure 2:
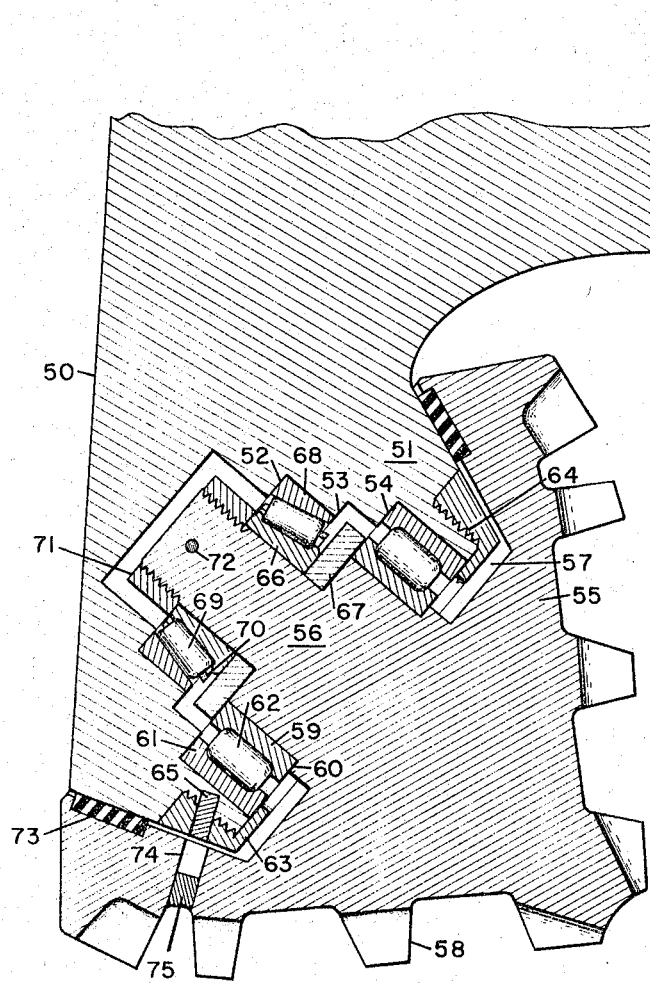
Figure 3:
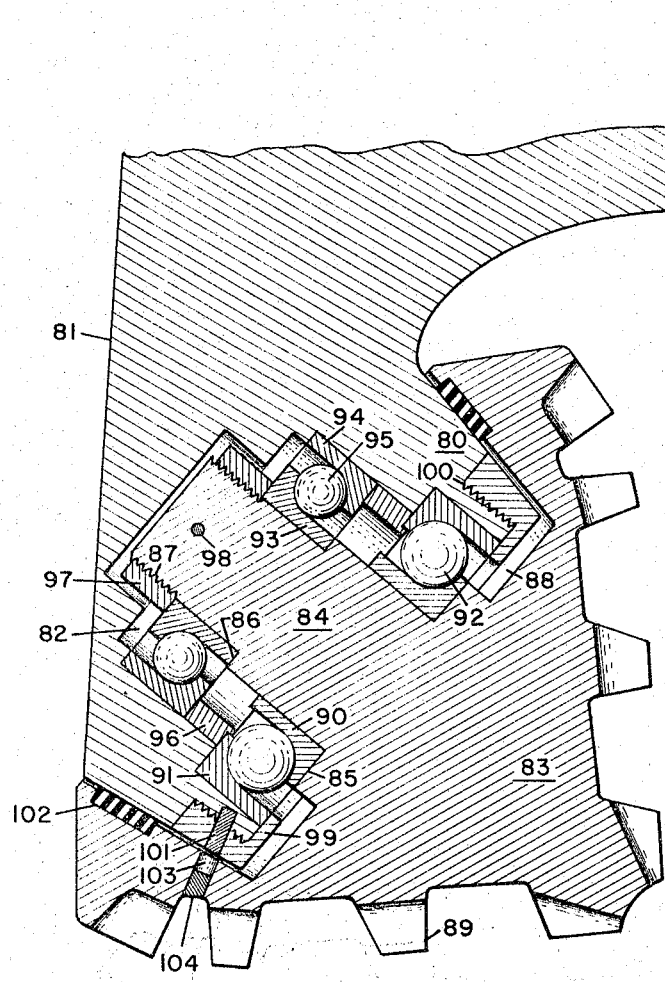

The nature and objects of the invention can best be understood by referring to the following detailed description of bits provided with the improved bearing assemblies and to the accompanying drawing, in which:

FIGURE 1 is a partial section through a rock bit provided with a reverse bearing assembly including sleeve, ball and roller bearings;
FIGURE 2 is a partial section through a bit provided with an alternate reverse bearing assembly; and
FIGURE 3 is a partial section through a bit utilizing still another reverse bearing arrangement.

The bit shown in FIGURE 1 of the drawing includes a body 11 provided with an upper shank 12 on which are located external threads 13. The shank and threads form a standard A.P.I. tool joint by means of which the bit may be connected to the lower end of a rotary drill string. Other connecting means, an A.P.I. tool joint box for example, may be provided in lieu of the pin if desired. An internal passageway 14 extends downwardly in the body of the bit from an opening in the upper end of the shank, not shown, to nozzles 15 in order to permit the discharge of drilling fluid beneath the tool. Only one nozzle is shown in the drawing but two or more nozzles will normally be provided. The nozzles are located so that they discharge fluid onto the formation between the cutting elements. Legs 16, only one of which appears in the drawing, are located at intervals about the body and are spaced to permit the mounting of cones beneath the bit bidy. Each leg includes a cantilever pin 17 which extends downwardly beneath the body from the inner surface of the leg at an angle of from about 25 to about 60 degrees to the horizontal. Each of the pins includes an internal recess 18 within which the bearing elements associated therewith are located. An opening 19 extends into this recess from the outer surface of the leg to permit insertion of the balls employed in this particular embodiment of the invention. It will be understood, although only a portion of the bit is shown in FIGURE 1 of the drawing, that the complete tool will normally include two or more legs and associated members.

A cylindrical reservoir 20 is preferably provided in each leg of the bit. The reservoir in the bit of FIGURE 1 extends downwardly from an opening, not shown, in the upper part of the leg. A passageway 21 extends from an inlet in the lower part of the reservoir to an outlet in the recess within the pin. A piston or diaphragm 22 in the upper part of the reservoir responds to pressure exerted by the drilling fluid surrounding the bit to force a lubricant from the reservoir into the recess in which the bearing elements are located. Passageway 23 closed by plug 24 is provided to permit refilling of the reservoir. Various other bit lubricating systems suitable for use with the bits of the invention have been described in the prior art and may be employed if desired. Such systems include lubricating subs which are connected into the drill string above the bit for forcing lubricant through passageways in the bit body and legs into the bearing enclosures.

A conical cutting element or cone 25 provided with external teeth 26, buttons, or similar projections for attacking the rock at the bottom of the borehole is mounted on pin 17. An axle 27 on the cone extends into axial recess 18 in the pin. The axle includes a shoulder 28 near the outer end thereof. An annular recess 29 in the cone surrounds the axle. The base of the cone thus extends over the pin adjacent the leg of the bit. A seal 30 of rubber, plastic or similar material is positioned in a groove in the outer wall of the annular recess to prevent the entry of drilling mud from the borehole into the bearing enclosure between the axle and the wall of recess 18. The seal shown rotates with the cone on the outer surface of the pin. Other seal assemblies for preventing the passage of fluids between the cone and pin surfaces may be utilized if desired.

The bearing arrangement employed on the bit shown in FIGURE 1 of the drawing includes a thrust bearing 35 positioned at the end of the cone axle, a sleeve bearing 36 located near the end of the axle, a ball bearing 37 positioned at an intermediate point along the axle, and a roller bearing 38 located near the base of the axle. The thrust bearing consists of a disc of Babbitt or similar bearing metal seated between the end of the axial recess and the end of the cone axle. This bearing extends into a recess in the end of the axle and thus aids in restricting lateral movement of the axle. The sleeve bearing, made of bronze or the like, seats against shoulder 39 near the end of the axial recess and fits closely about the outer end of axle 27. The ball bearing assembly includes outer races 40 machined in the wall of the axial recess and inner ball race 41 machined in the axle surface. The balls 37 are located between the two races. The ball bearing resists both axial and lateral forces exerted on the cone and thus limits the pressure applied to thrust bearing 35. The roller bearing located near the base of the axle and the outer end of the pin includes inner races 42 machined on the surface of the axle and outer races 43 machined in the inner wall of the axial recess. The rollers 38 between the races may be either cylindrical or tapered bearing rollers.

The bit shown in FIGURE 1 is assembled by first positioning thrust bearing 35 in the end of axial recess 18. Sleeve bearing 36 is then pressed into the axial recess until it seats against shoulder 39. Seal ring 30 is placed in the groove in the outer wall of annular recess 29. Rollers 38 are then positioned about the cone axle and held in place as the axle is slipped into the pin. The rollers slide along the surface of the axle until the cone is seated as shown in the drawing. Grease may be packed into the bearing recess as the bit is assembled. The balls 37 are then inserted through opening 19 into the space between outer ball race 40 and inner ball race 41. After the balls have been inserted, cylindrical plug 44, machined at its inner end to conform to the outer ball race, is inserted in ball opening 19 and welded in place as indicated by reference numeral 45.

Before the bit shown in FIGURE 1 of the drawing is used, the lubricant reservoir is filled through passageway 23 with a grease which melts above the maximum bit operating temperature. In filling the reservoir, air bubbles should be eliminated from the grease so that trapped air will not be compressed when the pressure is increased and thus make room for the entry of drilling fluid into the system. The grease placed in the reservoir is forced into the bearing enclosure through passageway 21 by forcing the diaphragm in the upper part of the reservoir downwardly with a suitable plug. The reservoir is then refilled and the process is repeated until grease flows past the bearing seal 30 and emerges in the space between the cone and the leg of the bit. This assures an adequate supply of grease to the bearing. The reservoir should then be refilled to provide additional grease to replace that which may be lost during operation of the bit.

The bearing arrangement shown in FIGURE 1 of the drawing significantly improves the life expectancy of the ball and roller bearings because of the use of stationary outer bearing races. It also facilitates sealing of the bearings by permitting the use of a seal extending over a large contact area. As a result of these and other advantages stemming from the reverse bearing arrangement shown, bits fitted with bearing assemblies of this type are more reliable and last longer than conventional rock bits.

The embodiment of the invention depicted in FIGURE 2 of the drawing differs from that described earlier in that prefabricated rolling contact bearing assemblies are employed. The bit of FIGURE 2 includes a leg 50 which extends downwardly from the body of the tool and is provided with a pin 51. The pin contains an axial recess which extends into the leg from an opening in the outer end of the pin and contains internal shoulders 52, 53 and 54. Cone 55 is provided with an axle 56 which extends into the recess in the pin. The base of the cone contains an annular recess 57 into which the pin fits about the axle. Teeth, buttons or the like 58 are provided on the outer surface of the cone to attack the rock formation beneath the bit as the cone rotates.

The bearing assembly in the bit of FIGURE 2 includes a front rolling contact bearing and a rear rolling contact bearing. The prefabricated front bearing is made up of an inner race 59 mounted near the base of the axle adjacent shoulder 60, an outer race 61 mounted in the pin recess in contact with shoulder 51, and cylindrical rollers 62 positioned between the races. A retaining ring 63 is connected to the end of the pin by means of threads 64 and secured by pin 65 to hold the outer race in place in contact with shoulder 54. The rear bearing assembly includes a tapered inner race 66 which seats against spacer 67 surrounding the cone axle, a tapered outer race 68 seated in contact with shoulder 52 in the pin recess, tapered rollers 69 and roller retainer 70. The inner race of the rear bearing faces toward the leg of the bit; while the outer race faces the apex of the cone. Ring 71 is threaded onto the end of the cone axle adjacent the inner race of the rear bearing to hold it in place and is secured by pin 72. If desired, the ring may be welded in place instead of bearing threaded on the axle as shown. A bearing seal 73 is located between the pin and cone as in the earlier embodiment.

In assembling the bit of FIGURE 2, the outer race 68 of the rear bearing is first pressed into the recess in the leg so that it contacts shoulder 52 therein. Retaining ring 63 is placed over the cone axle so that it rests at the bottom of recess 57. The enire front bearing, including outer race 61 and rollers 62 is then pressed onto the cone axle so that the inner race seats against shoulder 60 on the axle. Seal 73 is installed. Spacer 67 is placed on the axle in contact with the inner race of the front bearing. The inner race 66, rollers 69 and retainer 70 of the rear bearing are then pressed onto the axle. Ring 71 is threaded onto the end of the axle and secured by inserting pin 72 through a hole extending through the ring and end of the axle. This entire assembly is then inserted into the pin recess so that the rollers of the rear bearing fit into the outer race of the bearing and the outer race of the front bearing slides into the pin recess. A pin, not shown in the drawing, is inserted through a hole 74 in the cone into a corresponding hole in retaining ring 63. This engages the ring and permits it to be turned with the cone. The cone is then rotated so that the retaining ring is tightened on threads 64 to force the outer race of the front bearing into place against shoulder 54.

After the outer race has seated against shoulder 54 and the cone has thus been mounted on the pin 51, the hole in retaining ring 63 is aligned with a corresponding hole in the threaded portion of the pin. Pin 65 is driven through the hole in the cone into the holes in the ring and threaded portion of pin 51 to lock the ring in place and prevent it from turning due to vibration. The opening in the outer surface of the cone is closed by spot welding as indicated by reference numeral 75.

The bit shown in FIGURE 2 of the drawing has the same advantages over conventional bits as does that of FIGURE 1 and in addition possesses other advantages. The arrangement shown in FIGURE 2 permits the use of high precision, heavy duty bearings capable of taking the maximum loads to which rock bits are normally subjected. The use of separate inner and outer bearing races simplifies the machining of the bit leg and cone structures and makes possible the selection of the proper bearing elements without regard to the cutting and load transmitting requirements imposed on the materials employed in fabricating the cones and legs of the bit. The use of a ball plug which interrupts the outer race of one of the bearings and may cause local overstressing of the bearing due to discontinuities in the race is avoided. External loads are supported in the axial as well as the radial direction and hence the need for a third bearing is eliminated.

Difficulties due to the use of sleeve bearings and roller contact bearings on the same shaft are avoided. These and other advantages associated with the structure of FIGURE 2 generally result in considerably better bearing performance than can be obtained with conventional rock bits.

Still another embodiment of the invention is shown in FIGURE 3 of the drawing. This embodiment includes a short pin 80 which extends inwardly and downwardly beneath the body of the bit from leg 81. Recess 82 extends axially into the leg from an opening in the outer end of the pin. Cone 83 is provided with axle 84 which extends from the base of the cone into the pin recess. The axle of the cone includes shoulder 85 located near the base, intermediate shoulder 86 and threads 87 at the outer end of the axle. The cone includes annular recess 88 into which the pin extends and teeth, buttons or the like 89 for attacking the rock formation.

The front bearing employed on the embodiment shown in FIGURE 3 is a ball bearing provided with an angular inner race 90 which is mounted on the pin adjacent shoulder 85, an angular outer race 91, and balls 92. The rear bearing is of similar structure and includes inner race 93 mounted on the pin in contact with shoulder 86, outer race 94 seated in contact with the wall of the pin recess, and balls 95. The outer races are separated from one another by means of annular retainer 96. Ring 97 is threaded onto the end of the axle and secured by pin 98 to hold the inner race of the rear bearing in place. The outer race of the front bearing is secured by annular retainer 99 which is in turn held onto the end of pin by threads 100. Pin 101, inserted through a hole in the cone of the bit, prevents the retainer from turning due to vibration. A bearing seal 102 is located between the pin and cone and may be similar to that described in connection with the bit of FIGURE 1.

The bit of FIGURE 3 is assembled by first placing annular retainer 99 in the cone recess surrounding axle 84. The inner race 90 of the front bearing is then pressed onto the axle and the bearing is assembled by slipping the outer race 91 over the end of the axle and placing the balls 92 between the two races. Spacer 96 is placed over the end of the pin so that it rests against the outer race of the front bearing. Following this, the outer race 94 of the front bearing is slipped over the end of the axle in contact with the spacer. The inner race 93 of the front bearing is pressed onto the pin after the balls have been placed between the two races. Once that has been done, ring 97 is threaded onto the axle of the cone and, after the bearing elements have been adjusted, pin 98 is inserted to hold it in place. A pin, not shown, is inserted through a hole 103 in the cone to engage annular retainer 99 so that it can be turned with the cone. The axle with the bearings in place is then forced into the pin recess until the threads on retainer 99 engage those on the outer surface of the pin. The cone is rotated to tighten the retainer in place and thus hold the cone on the pin. Pin 101 is inserted through hole 103 into holes in retainer 99 and the threaded portion of pin 80 to prevent loosening of the retainer. The assembly is completed by welding the hole in the outer surface of the cone shut as indicated by reference numeral 104.

The bit of FIGURE 3 possesses advantages similar to those of the bits shown in FIGURES 1 and 2 and in addition is easier to assemble. Since both of the ball bearings can be adjusted before the cone axle is inserted in the pin, a tight, slightly prestressed assembly is easily obtained. The use of two ball bearings in this manner avoids the tendency sometimes exhibited by roller bearings to skew and lock the cone in place. It also makes the bit assembly less susceptible to misalignment of the pin and cone than earlier embodiments. The use of large balls and separate inner and outer races promotes long bearing life and reduces bearing failure to a minimum.

It will be understood that the invention is not necessarily limited to the specific bearing arrangements shown in the drawings. A variety of different ball and roller bearing assemblies may be mounted between the cone axle and the wall of the pin recess to secure the advantages outlined above. In similar manner, seal assemblies and lubrication systems other than those described specifically in conjunction with FIGURE 1 of the drawing may be employed. These and other modifications of the invention will be apparent to those skilled in the art.

What is claimed is:
1. A rotary drill bit which comprises:
 (a) a body member provided with means near the upper end thereof for connecting said member to the lower end of a drill string and with an internal passageway extending from an inlet in the upper end of said member to an outlet in the lower surface of said member;
 (b) a leg depending from said body member, said leg including a cantilever pin extending inwardly and downwardly beneath said body member and said pin containing an axial recess extending inwardly in said pin from an opening in the free end thereof;
 (c) a conical cutting element provided with an axle extending from the base thereof and an annular recess surrounding said axle, said axle extending into said axial recess in said pin;
 (d) a thrust bearing positioned within said axial recess between the end of said recess and the end of said axle;
 (e) a sleeve bearing positioned within said axial recess between the wall of said recess and said axle, said sleeve bearing seating against a shoulder in said axial recess near the end thereof;
 (f) a plurality of balls positioned within said axial recess between an inner race on the surface of said axle and an outer race on the wall of said axial recess at an intermediate point therein, said balls and races limiting axial movement of said cutting element with respect to the leg of said bit; and
 (g) a plurality of roller bearings positioned within said axial recess between an inner race on the surface of said axle and an outer race on the wall of said axial recess at a point near the outer end of said axial recess.

2. A bit as defined by claim 1 including bearing seals positioned in said annular recess between the outer surface of said pin and the inner surface of said cone.

3. A rotary drill bit which comprises:
 (a) a body member provided with means near the upper end thereof for connecting said member to the lower end of a drill string and with an internal passageway extending from an inlet in the upper end of said member to an outlet in the lower surface of said member;
 (b) a leg depending from said body member, said leg including a cantilever pin extending inwardly and downwardly beneath said member and said pin containing an axial recess extending inwardly in said pin from an opening in the free end thereof;
 (c) a conical cutting element provided with an axle extending from the base thereof into said axial recess in said pin, said cutting element including an annular recess about said axle into which the free end of said pin extends;
 (d) a rear rolling contact bearing positioned within said axial recess, said rear bearing including an inner race mounted on said axle adjacent a shoulder thereon, an outer race mounted in said axial recess near the inner end thereof, and a plurality of rolling members positioned between said inner and outer races;
 (e) a front rolling contact bearing positioned within said axial recess, said front bearing including an inner race mounted on said axle adjacent a shoulder thereon, an outer race mounted in said axial recess near the outer end thereof, and a plurality of rolling members positioned between said inner and outer races; and (f) means on said pin and axle for limiting axial movement of said cutting element and bearings with respect to the leg of said bit.

4. A bit as defined by claim 3 wherein said front and rear bearings are ball bearings.

5. A bit as defined by claim 3 wherein said front and rear bearings are roller bearings.

6. A rotary drill bit which comprises:
(a) a body member provided with means near the upper end thereof for connecting said member to the lower end of a drill string and with an internal passageway extending from an inlet in the upper end of said member to an outlet in the lower surface of said member;
(b) a leg depending from said body member, said leg including a cantilever pin extending inwardly and downwardly beneath said member and said pin containing an axial recess extending inwardly in said pin from an opening in the free end thereof;
(c) a front roller bearing assembly mounted in said recess in said pin near the outer end thereof, said front bearing assembly including an outer race mounted in contact with an internal shoulder in said recess, an inner race, and a plurality of rollers positioned between said inner and outer races;
(d) a rear roller bearing assembly mounted in said recess in said pin near the inner end thereof, said rear bearing assembly including an outer race mounted in contact with an internal shoulder in said recess, an inner race, and a plurality of rollers positioned between said inner and outer races;
(e) a conical cutting element positioned on said pin, said cutting element including an axle extending into said recess in said pin and said inner races of said front and rear bearing assemblies being mounted on said axle; and
(f) means on said axle for holding said inner races of said front and rear bearing assemblies in place thereon.

7. A rotary drill bit which comprises:
(a) a body member provided with means near the upper end thereof for connecting said member to the lower end of a drill string and with an internal passageway extending from an inlet in the upper end of said member to an outlet in the lower surface of said member;
(b) a leg depending from said body member, said leg including a cantilever pin extending inwardly and downwardly beneath said member and said pin containing an axial recess extending inwardly in said pin from an opening in the free end thereof;
(c) a front ball bearing assembly mounted in said recess in said pin near the outer end thereof, said front bearing assembly including an angular outer race mounted in contact with an internal shoulder in said recess, an angular inner race, and a plurality of balls positioned between said inner and outer races;
(d) a rear ball bearing assembly mounted in said recess in said pin near the inner end thereof, said rear bearing assembly including an angular outer race mounted in contact with an internal shoulder in said recess, an angular inner race, and a plurality of balls positioned between said inner and outer races;
(e) a conical cutting element positioned on said pin, said cutting element including an axle extending into said recess in said pin and said inner races of said front and rear bearing assemblies being mounted on said axle; and
(f) means on said axle for holding said front and rear bearing assemblies in place thereon.

References Cited by the Examiner
UNITED STATES PATENTS

| | | | |
|---|---|---|---|
| 1,305,489 | 6/1919 | Patin | 175—372 X |
| 1,388,424 | 8/1921 | George | 175—336 X |
| 1,792,604 | 2/1931 | Reed | 175—372 X |
| 1,973,975 | 9/1934 | Carlson | 175—372 X |
| 2,227,209 | 12/1940 | Zublin | 175—354 X |
| 2,336,335 | 12/1943 | Zublin | 175—354 X |
| 2,644,671 | 7/1953 | Ingram | 175—354 |
| 2,676,790 | 4/1954 | Turner | 175—370 |
| 3,193,028 | 7/1965 | Radzimovsky | 175—372 |

JACOB L. NACKENOFF, *Primary Examiner.*

CHARLES E. O'CONNELL, *Examiner.*

N. C. BYERS, *Assistant Examiner.*